United States Patent
Habuta et al.

(10) Patent No.: US 7,286,255 B2
(45) Date of Patent: Oct. 23, 2007

(54) METHOD, SYSTEM, AND PROGRAM FOR STORING IMAGES

(75) Inventors: Shizuo Habuta, Tokyo (JP); Hideki Morikawa, Tokyo (JP); Katsuo Ogura, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 693 days.

(21) Appl. No.: 10/358,428

(22) Filed: Feb. 5, 2003

(65) Prior Publication Data

US 2003/0151767 A1 Aug. 14, 2003

(30) Foreign Application Priority Data

Feb. 8, 2002 (JP) ............... 2002-032430

(51) Int. Cl.
*G06F 3/12* (2006.01)
*G06K 15/00* (2006.01)

(52) U.S. Cl. .............. 358/1.15; 358/1.18; 358/1.1

(58) Field of Classification Search ......... 358/1.1–1.18
See application file for complete search history.

(56) References Cited

U.S. PATENT DOCUMENTS

| | | | |
|---|---|---|---|
| 5,017,014 A | 5/1991 | Terashita | |
| 6,092,023 A | 7/2000 | Kunishige | |
| 6,211,974 B1 | 4/2001 | Haneda | |
| 6,278,531 B1 | 8/2001 | Tesavis | |
| 6,324,521 B1 | 11/2001 | Shiota et al. | |
| 6,346,998 B2 | 2/2002 | Shiota et al. | |
| 6,798,531 B1 * | 9/2004 | Paz-Pujalt et al. | 358/1.15 |
| 6,856,414 B1 * | 2/2005 | Haneda et al. | 358/1.15 |
| 6,965,404 B2 * | 11/2005 | Hosoda et al. | 348/231.6 |
| 2001/0041018 A1 | 11/2001 | Sonoda | |
| 2001/0055126 A1 | 12/2001 | Hiromichi | |

FOREIGN PATENT DOCUMENTS

| | | |
|---|---|---|
| EP | 1 004 967 A1 | 5/2000 |
| JP | 7-141488 A | 6/1995 |
| JP | 10-143631 A | 5/1998 |
| JP | 11-238114 A | 8/1999 |
| JP | 2001-218057 A | 8/2001 |
| JP | 2002-27233 A | 1/2002 |

* cited by examiner

*Primary Examiner*—Douglas Q. Tran
(74) *Attorney, Agent, or Firm*—Birch, Stewart, Kolasch & Birch, LLP

(57) ABSTRACT

Negative films and prints neglected in households are organized efficiently. A user [2] requests of a DPE store [3] image reading from negative films neglected in his/her home. The DPE store [3] requests image reading from a laboratory [4]. In the laboratory [4], images are read from the negative films by an image generation apparatus [40], and image data sets are obtained. The time period of production of the respective negative films is specified by reading a code number recorded on the negative films, and information [J] including date/time information representing the time period is obtained. The image data sets are sent to an image storage server [6] together with the information [J], and classified and stored according to the user and the time period.

41 Claims, 13 Drawing Sheets

FIG.3

| | ITEMS | HOW THE INFORMATION IS RECORDED | | |
|---|---|---|---|---|
| | | LABORATORY | | INPUT BY USER |
| | | AUTOMATIC INPUT (AUTOMATIC JUDGMENT) | MANUAL INPUT BY OPERATOR | |
| 1 | DATE/TIME OF DIGITIZATION | ○ | | |
| 2 | USER ID | ○ | | |
| 3 | ORDER NUMBER | ○ | | |
| 4 | FRAME NUMBER | ○ | (○) | |
| 5 | FILE NAME | ○ | | |
| 6 | USER FILE NAME | | | ○ |
| 7 | FOLDER NAME | ○ | ○ | ○ |
| 8 | TYPE OF FILM | ○ | | |
| 9 | TIME PERIOD OF FILM PRODUCTION | ○ | (○) | ○ |
| 10 | TIME PERIOD OF PRINTING | ○ | (○) | ○ |
| 11 | DATE OF FILM PRODUCTION | ○ | (○) | ○ |
| 12 | DATE OF PRINTING | ○ | (○) | ○ |
| 13 | SCENE INFORMATION | ○ | (○) | ○ |
| 14 | FADED COLOR CORRECTION | ○ | (○) | ○ |
| 15 | ORIENTATION INFORMATION | ○ | (○) | ○ |
| 16 | SCAR REMOVAL | ○ | (○) | ○ |
| 17 | RED EYE CORRECTION | ○ | (○) | ○ |
| 18 | APS-CHP | ○ | | |
| 19 | 135-FHP | ○ | (○) | |
| 20 | PRINT SIZE | ○ | | |
| 21 | NUMBER OF PIXELS | ○ | | |
| 22 | MODIFICATION HISTORY | | | ○ |
| 23 | DISCLOSURE INFORMATION | | | ○ |
| 24 | DISCLOSURE LEVEL | | | ○ |
| 25 | DELETION PROTECTION | | | ○ |
| 26 | EDITING PROTECTION | | | ○ |
| 27 | OWNER INFORMATION 1 | | | ○ |
| 28 | OWNER INFORMATION 2 | | | ○ |
| 29 | DIGITIZATION INFORMATION | ○ | | |
| 30 | LOCATION OF PHOTOGRAPHY | ○ | | ○ |
| 31 | COMMENT | | | ○ |
| 32 | MEMORANDUM | ○ | (○) | |

| SERIAL NUMBER | USER ID | IMAGE ID | SIZE | DATE/TIME OF UPDATE |
|---|---|---|---|---|
| 1 | XXXX | | | |
| 2 | YYYY | | | |
| 3 | ZZZZ | | | |

FIG.9

| NUMBER | USER ID | IMAGE ID | SIZE | DATE/TIME OF UPDATE | IMAGE ATTRIBUTE INFORMATION | USER INFORMATION | OTHER INFORMATION |
|---|---|---|---|---|---|---|---|
| 1 | xxxx | aaaa | | | | | |
| 2 | | aaab | | | | | |
| 3 | yyyy | pppp | | | | | |
| 4 | . | . | | | | | |
| 5 | . . | . . | | | | | |

FIG.10

METHOD, SYSTEM, AND PROGRAM FOR STORING IMAGES

This nonprovisional application claims priority under 35 U.S.C. § 119(a) on patent application Ser. No. 2002-032430 filed in JAPAN on Feb. 8, 2002, which is herein incorporated by reference.

BACKGROUND OF THE INVENTION

1. Field of the Invention

The present invention relates to an image storing method and an image storing system for storing image data obtained by reading an image from a film or a print. The present invention also relates to a program embodied on a computer-readable recording medium that causes a computer to execute the image storing method.

2. Description of the Related Art

Conventional prints using silver salt photographic films have been used in various manners. For example, one may check how his/her prints look or communicate with his/her friends by sharing the prints or by sending additional prints thereto. In other cases, conventional prints are enlarged for display or stored in the form of photograph albums. However, such prints using silver salt photographic films tend to accumulate in large quantities if not organized frequently, and utilization thereof, such as searching for a desired one of the prints or using the prints for additional print generation, becomes difficult. Especially, in the case where the prints are simply stacked, the prints are often not sorted in order of photographing, leaving organization thereof more difficult.

Meanwhile, if such prints are organized frequently, the prints can be utilized easily. However, classifying the prints in order of photographing or according to themes is time-consuming. Furthermore, even if the prints are organized in the form of photograph albums, only one set of photograph albums is generally made. Therefore, sharing the prints with a considerable number of people or with a person living far away is difficult.

If the prints are not organized, not only the prints but also negative films are stacked. Such negative films are kept as they are or stored in a box or a bag without being classified. Furthermore, as a user who is the photographer of the prints ages and his/her family expands with children and grandchildren, the number of negative films and prints also increases. Therefore, a large amount of prints or negative films result if not organized properly. Since printing becomes impossible without prints or negative films, the prints and negative films are rarely disposed of. Consequently, many families have a trouble in organizing or storing such prints and films.

Meanwhile, a photograph service system has been proposed, as has been described in U.S. Pat. No. 6,346,998, for example. By using such a system, image data obtained by reading images recorded on a negative film or prints with use of a reading apparatus such as a scanner are stored in a recording medium such as a CD-R. The image data can further be viewed with use of a reproduction apparatus such as a personal computer, or printed according to a request made by a user. Furthermore, a network photograph service system comprising an image storing system has also been proposed (see U.S. Pat. No. 6,324,521, for example). In such a system, image data are stored in an image storage server by being sent thereto via a network such as the Internet. The image data can be viewed with use of a terminal that is located away from the image storage server, and the system can deal with various kinds of processing such as printing order processing.

However, in such an image storing system, images are read from negative films during printing processing including film development, and image data are stored in classification according to the rolls of film. Therefore, relating a user who requested storage of the image data with each of the rolls of film is difficult. Moreover, since images are stored by simply reading the images from negative films, a large amount of image data are simply stored without being classified if the images are read from the films or prints neglected in a household as has been described above. In this case, a user accessing the image storage server needs to organize the large amount of image data. However, organization of such image data is as troublesome as organization of the negative films and prints. Consequently, the system is inconvenient to use.

SUMMARY OF THE INVENTION

The present invention has been conceived based on consideration of the above circumstances. An object of the present invention is therefore to efficiently organize image data obtained by reading images recorded on negative films and prints that have been neglected in a household.

An image storing method of the present invention comprises the steps of:

obtaining at least one image data set representing at least one image by photoelectrically reading the image or images from a recording medium that records the image or images thereon;

obtaining recording medium information regarding the recording medium and user information representing a user who requested the reading of the image or images; and storing the image data set or sets in classification according to the user, based on the user information, while relating the image data set or sets to the recording medium information.

Any medium that can record the image or images thereon can be used as the recording medium. For example, a negative film, a reversal film, and prints can be used as the recording medium. Furthermore, not only a negative film that records a plurality of images thereon but also a print that can record one image thereon or a reversal film used as a slide can be included in the recording medium, since the recording medium stores "at least one image".

The "user information" refers to information used for classification or search of users. More specifically, the user information includes the specific ID, the name, the phone number, the E-mail address, the address, the age, and family make-up of each of the users, for example.

Information on date/time of photography recorded in the recording medium and/or specified by the user, regarding the image or images can be used as the "recording medium information".

The "information on date/time of photography" may be information specifying the exact date/time of photography, or information specifying an approximate time period of photography. Furthermore, the recording medium information includes not only information that can directly specify the date/time of photography but also information that can indirectly specify the date/time of photography by referring to a data base or the like. More specifically, the information includes the date imprinted on the image or images, information on the date/time of photography recorded as magnetic information in a magnetic recording area of an APS film, the date of photography imprinted on a print or prints, information recorded in a white margin or on the back of a print, and a code number specific to and recorded on each roll of photographic film. The code number specific to each film roll is recorded by a film manufacturer at the time of film production, and the time period of film production can be known by referring to the code number. Therefore, by generating a database relating the code number with the time period of film production, the time period can be known with reference to the database according to the code number. A method of obtaining information on the date/time of photography by referring to the date imprinted on each image is disclosed in Japanese Unexamined Patent Publication No. 7(1995)-141488.

The "information on date/time of photography specified by the user" refers to information on date/time of photography specified by the user when he/she requests the image reading. For example, in the case of a negative film, information on the date written on a sheet containing the negative film is used as the information. Alternatively, information on the date written by the user on a predetermined data sheet and/or mentioned by the user can be used as the information on the date/time of photography. "Relating the image data set or sets to the recording medium information" refers to generation of a database on the image data set or sets and storing the recording medium information in relation to the file name or names of the image data set or sets in the database, for example. Each image data file has so-called meta-data attached thereto. For this reason, the recording medium information may be related to the image data set or sets by being recorded in the meta-data of the file or files of the image data set or sets. "Storing the image data set or sets in classification according to the user" refers to generation of a folder for the user and storing the image data set or sets of the user identified by the user information in the folder. Alternatively, information representing the location of the image data set or sets (such as a shortcut) may be stored in the folder of the user identified by the user information.

The image data set or sets are "stored" not only in a recording medium such as a hard disc of an apparatus that carries out the image storing method of the present invention, a CD-R, a DVD-R, an MO disc, or a memory card but may also be stored in an image server connected to such an apparatus via a wired or wireless network.

The image storing method of the present invention may further comprise the step of:

obtaining at least one item of characteristic information representing at least one characteristic of the image or images. In this case, the step of storing the image data set or sets is the step of storing the image data set or sets in further relation to the item or items of characteristic information.

The item or items of "characteristic information" refers to a location of photography, information on a scene or scenes of the image or images (such as people, scenery, or night view), information on an image type (such as group photo or portrait), and information on image orientation (such as portrait mode or landscape mode), for example. The item or items of characteristic information may be obtained by automatically analyzing the image or images or by a manual input according to an instruction of the user.

The image data set or sets in the image storing method of the present invention may be stored with image processing including image restoration processing carried out thereon.

The "image restoration processing" refers to processing such as removing a scar or stain on the image or images recorded on the recording medium, restoring colors that have faded into a sepia color due to elapsed time, and correction of red eyes that tend to occur in the case of photography using flash.

An image storing system of the present invention comprises:

image reading means for obtaining at least one image data set representing at least one image by photoelectrically reading the image or images from a recording medium that records the image or images thereon;

information acquisition means for obtaining recording medium information regarding the recording medium and user information representing a user who requested the reading of the image or images; and image storing means for storing the image data set or sets in classification according to the user, based on the user information, while relating the image data set or sets to the recording medium information.

In the image storing system of the present invention, the "recording medium information" may include information on date/time of photography recorded on the recording medium and/or specified by the user, regarding the image or images.

In the image storing system of the present invention, the information acquisition means may obtain at least one item of characteristic information on the image or images; and the image storing means may store the image data set or sets in further relation to the item or items of characteristic information.

The image storing system of the present invention may further comprise image processing means for carrying out image processing including image restoration processing on the image data set or sets.

The image storing method of the present invention may be provided as a program that causes a computer to execute the image storing method.

According to the present invention, the image data set or sets are obtained from the recording medium storing the image or images, and the recording medium information and the user information is also obtained. The image data set or sets are related to the recording medium information, which are stored in classification according to the user based on the user information. Therefore, if the user only requests the image reading without organizing a large amount of negative films or prints that have been neglected, the image data set or sets can be viewed in relation to the recording medium information. Since the image data set or sets are stored in classification according to the user, the user can be easily related to the image data set or sets obtained by the image reading. Furthermore, the user can easily organize the image data set or sets himself/herself according to the image data set or sets that have already been organized.

Moreover, by obtaining the item or items of characteristic information on the image or images and by storing the item or items in relation to the image data set or sets, the image data set or sets can be organized based on the item or items of characteristic information.

In many cases, prints or negative films neglected at home are often scarred or stained, or have faded colors such as a sepia color. Furthermore, red eyes are often observed in the case of photography using flash. However, by carrying out the image processing including the image restoration processing on the image data set or sets, a scar or stain can be removed and the faded colors or red eyes can be corrected. In this manner, the image data set or sets are stored, enabling high-quality image reproduction.

BRIEF DESCRIPTION OF THE DRAWINGS

FIG. 3 shows detailed items of information;

FIG. 9 shows a structure of basic image information in the image storage database;

FIG. 10 shows a structure of the image information database;

DESCRIPTION OF THE PREFERRED EMBODIMENT

Figure 1:
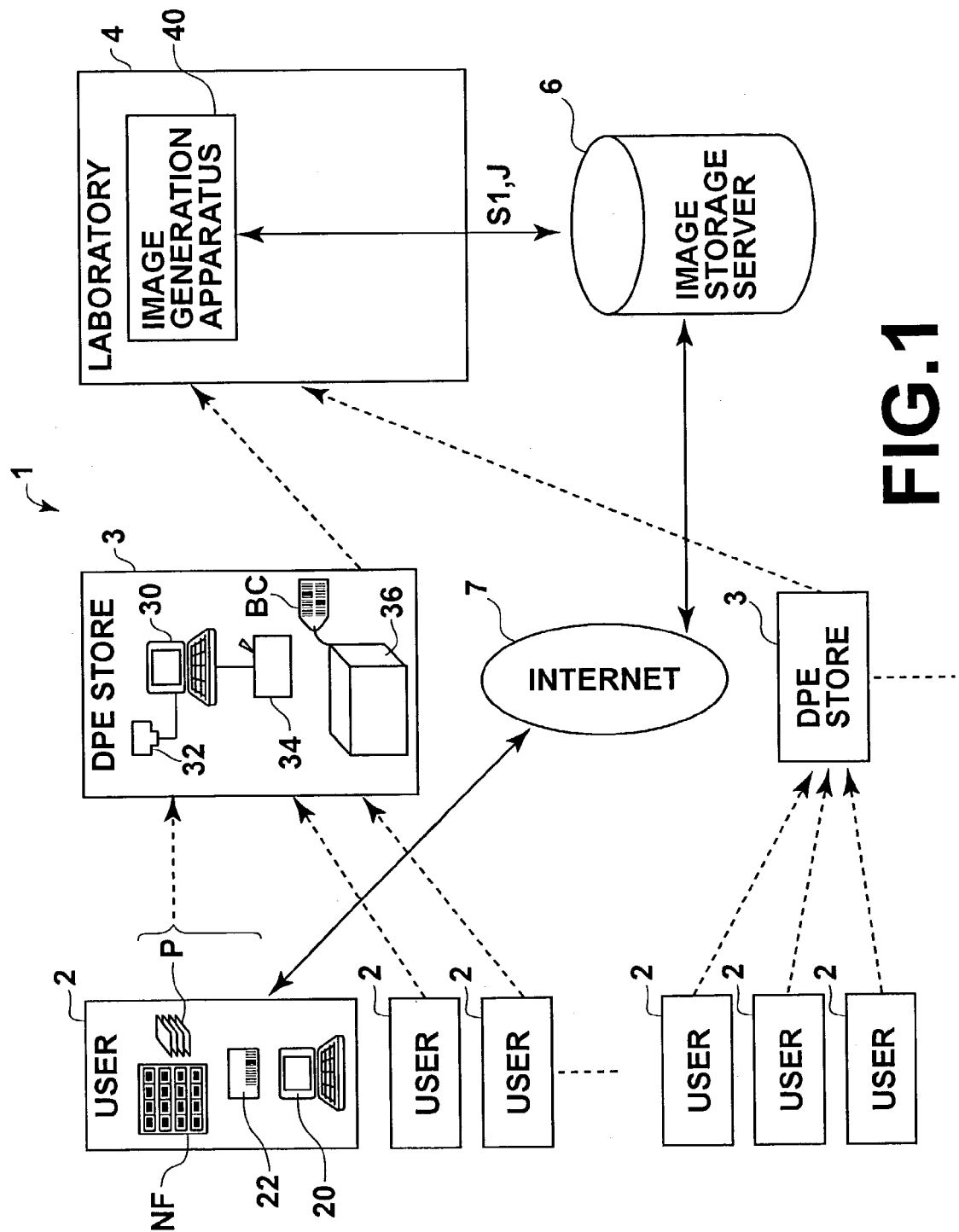
FIG. 1 is a diagram showing a configuration of an image storing system as an embodiment of the present invention.

Hereinafter, an embodiment of the present invention will be explained with reference to the accompanying drawings. FIG. 1 is a diagram showing a configuration of an image storing system as the embodiment of the present invention. As shown in FIG. 1, an image storing system 1 in this embodiment exchanges negative films, prints, image data sets, and the like among a plurality of users 2, a plurality of DPE stores 3 that receive orders placed by the users for storing images, a laboratory 4 for carrying out various kinds of processing such as storing the images by receiving the orders via the DPE stores 3, and an image storage server 6 for storing the image data sets obtained by the laboratory 4.

Each of the users 2 has a large amount of negative films NF and prints P that are not kept in order, and requests image reading from the negative films NF or the prints P of any one of the DPE stores 3. Each of the users 2 has a user terminal 20 such as a personal computer connected to the Internet 7, and can access the image storage server 6 or browse through his/her images stored therein. At the same time, each of the users 2 can also organize and correct the images, request generation of an electronic photograph album, place a printing order, and input various kinds of information.

The image storing system in this embodiment is used by members only, and each of the users 2 registers his/her membership with any one of the DPE stores 3 to receive a user ID card 22 on which user ID for identifying himself/herself is recorded as a bar code. Each of the users 2 also registers user information such as the name, the address, age, the phone number, the E-mail address, and family make-up thereof. The user information is registered with databases in the laboratory 4 and in the image storage server 6, as will be explained later. The membership registration may be carried out by using the image storage server 6 via the Internet 7. In this case, the user ID card 22 is provided by postal delivery or the like.

Each of the DPE stores 3 receives an order of image reading from one or more of the negative films NF owned by any one of the users 2 who visits the DPE store (hereinafter referred to as the user 2), and places the order to the laboratory 4. Upon reception of the order, the DPE store 3 that the user 2 visited (hereinafter referred to as the DPE store 3) reads the user ID from the user ID card 22 presented by the user 2, and outputs the user ID as a label (hereinafter referred to as a bar code label BC). At this time, the bar code label BC includes store ID for identifying the DPE store 3. For this reason, each of the DPE stores 3 has a personal computer 30 comprising a bar code reader 32 for reading the user ID from the user ID card 22 and a printer 34 for printing the user ID and the store ID as the bar code label BC.

Each of the negative films NF is cut into film pieces having 6 frames respectively, and stored in a film storage sheet. In this state, the user 2 brings the negative films NF to the DPE store 3. Therefore, a clerk at the DPE store 3 confirms the number of the film storage sheets. The clerk transcribes on an order form the number of the sheets, the name and phone number of the user 2, and various kinds of instructions made by the user 2. Thereafter, the film storage sheets are put in a container 36 dedicated to the user 2, together with the order form. The container 36 is attached with the bar code label BC representing the user ID and the store ID. The container 36 storing the negative films NF or the prints P is delivered to the laboratory 4 by mail or the like.

The laboratory 4 comprises an image generation apparatus 40. The image generation apparatus 40 obtains a plurality of image data sets S0 by reading the prints P or the images recorded on the negative films NF, and carries out various kinds of processing on the image data sets S0. In this manner, processed image data sets S1 are generated and stored in the image storage server 6.

Figure 2:
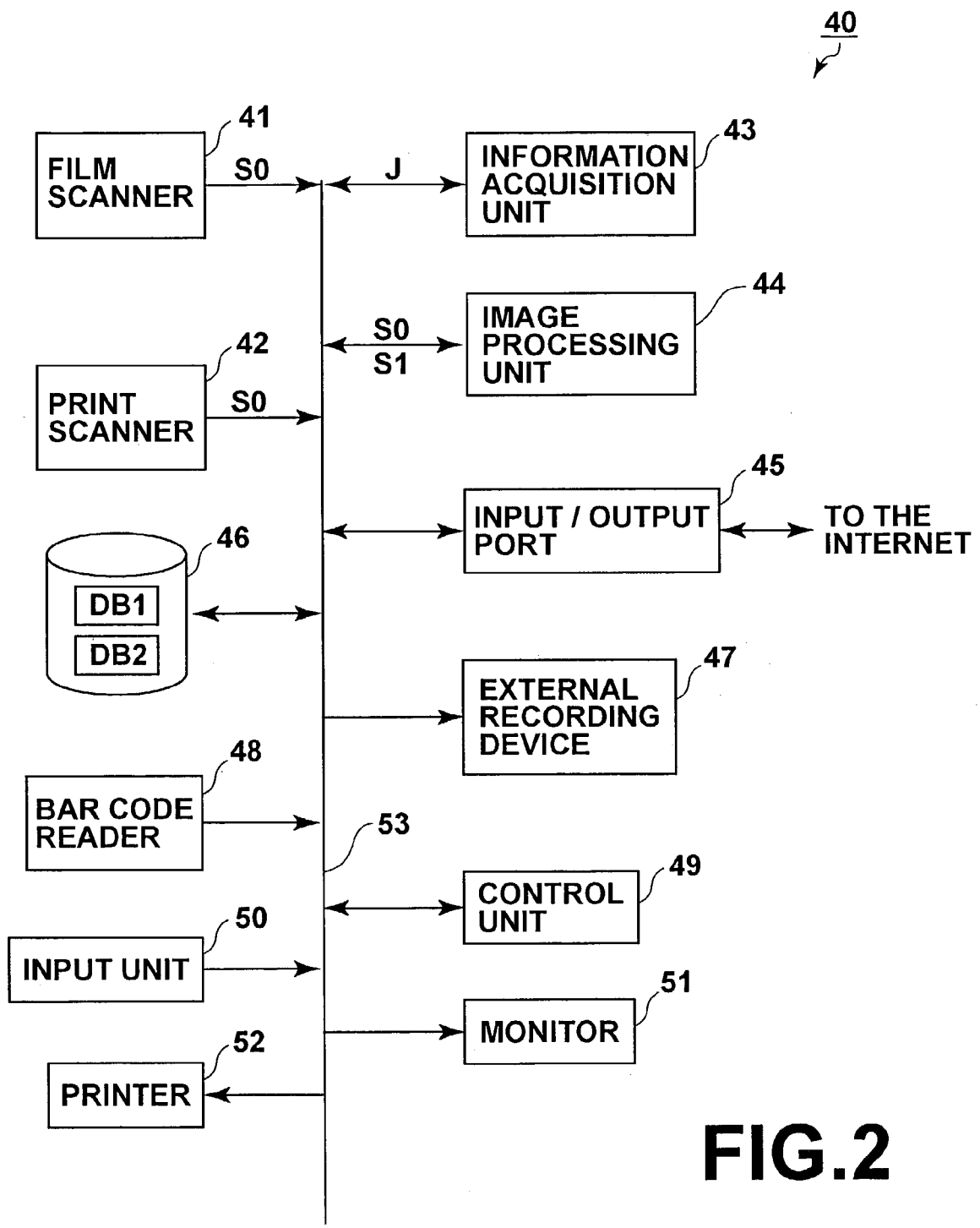
FIG. 2 is a block diagram showing a configuration of an image generation apparatus.

As shown in FIG. 2, the image generation apparatus 40 comprises the following components. A film scanner 41 obtains the image data sets S0 by reading the images recorded on the negative films NF, and a print scanner 42 obtains the image data sets S0 by reading the images recorded on the prints P. An information acquisition unit 43 obtains information J from the prints P and from the negative films NF. The information J comprises information on the date/time of photography (hereinafter referred to as date/time information D), scene information SC representing scenes of the images represented by the image data sets S0, and other information. An image processing unit 44 obtains the processed image data sets S1 by carrying out the image processing and image restoration processing on the image data sets S0. An input/output port 45 is used for various inputs and outputs, such as outputs of the processed image data sets S1 obtained by the image processing unit 44 and the information J to the Internet 7. A hard disc 46 stores the processed image data sets S1, a user information database DB1 storing the user information, and a date/time database DB2 regarding the date/time information D as will be explained later. An external recording device 47 records the processed image data sets S1 in a recording medium such as a CD-R, a DVD-R, an MO disc, or an optical card. A bar code reader 48 reads the user ID and the store ID from the bar code label BC. A control unit 49 controls the operation of the image generation apparatus 40. An input unit 50 comprises a mouse and a keyboard. A monitor 51 is used for various kinds of display, and a printer 51 outputs various kinds of prints. A bus 53 connects all the components described above.

The film scanner 41 sequentially reads the images recorded on the negative films NF, and obtains the image data sets S0 representing the images. As has been described above, each of the negative films NF is cut into the film pieces of 6 frames each and stored in the film storage sheet to be provided to the laboratory 4. Therefore, an operator in the laboratory 4 puts together the negative films stored in the film storage sheets, and forms a film roll comprising the negative films NF, before the image reading. The film scanner 41 reads the images from the film roll.

Notches representing boundaries between the film pieces are used as optical information for the joints of the film pieces in the film roll. Notches of another shape are also used for joints of the negative films as optical information representing boundaries between the negative films NF stored respectively in the film storage sheets. By referring to the notches at the time of image reading with use of the film scanner 41, information representing the boundaries (hereinafter referred to as boundary information) between the film pieces and the negative films NF is obtained. By obtaining such boundary information, the image data sets S0 obtained from the film roll can be classified according to the negative films and the film pieces.

Instead of the notches, holes or bar codes may be used as the optical information representing the joints. Alternatively, magnetic information may be used instead of the optical information.

By distinguishing the image data sets S0 according to the film pieces, even if a portion of the film pieces happens to be reversed at the time of film roll generation, the case can be dealt with, for example. By reading the date imprinted in the images and by carrying out character reading thereon, the images are judged to be reversed if the character reading is not successful. In this case, the image data sets S0 obtained from the portion of the film pieces including the reversed images are subjected to reversal processing.

By distinguishing the image data sets S0 according to the negative films as well, the processed image data sets S1 can also be stored in classification according to the negative films.

The print scanner 42 obtains the image data sets S0 by reading the images recorded on the prints P.

The information acquisition unit 43 obtains the date/time information D from the negative films NF and the prints P. Each of the negative films NF has a specific code number (hereinafter referred to as a "DX code") and the time period in which the film is produced can be estimated by referring to the DX code. For this reason, the information acquisition unit 43 reads the DX code recorded on each of the negative films NF, and obtains the date/time information D representing the time period by referring to the date/time database DB2 stored in the hard disc 46, as will be explained later.

In the case where the negative films NF include a so-called APS film that has a magnetic recording area for recording magnetic information therein, the date/time of photography can be recorded in the magnetic recording area. In this case, the magnetic information representing the date/time of photography and recorded in the magnetic recording area can be read and used as the date/time information D.

In the case where the date of photography is imprinted in each of the images, the date is read and subjected to character recognition. In this manner, the date can be known and the information obtained by reading the imprinted date can be used as the date/time information D. In some cases, the imprinted date is not easy to read. In such a case, the date/time information D of the image or images whose imprinted date cannot be read may be found based on the date read from neighboring images.

Meanwhile, in the case where each of the prints P has the date imprinted thereon, the date is read and subjected to character recognition. In this manner, the date can be known and the information obtained by reading the imprinted date can be used as the date/time information D.

In the case of prints P each having a white margin, information representing the time period of generation of the prints maybe included in the margin, such as "Fujicolor 99". In other cases, the information may be written on the back side of the prints P. In those cases, the margin or the back side is read and subjected to character recognition, and information obtained in this manner can be used as the date/time information D.

In some cases, the user 2 may have written the date of photography on the film storage sheets, on a bag containing the film storage sheets, and/or on the backside of the prints P. Furthermore, the user 2 may instruct a clerk to write the date of photography at the time the user requests storing of the images. In this case, the instruction is written on the order form. Therefore, the operator at the laboratory 4 receives an input of the date by using the input unit 50, and the date may be used as the date/time information D.

As has been described above, the date/time information D can be obtained through various kinds of information sources, such as the DX code, the date imprinted in the images, the date instructed by the user 2, and the information recorded on the margin or the backside of the prints P. Therefore, priority is preferably determined in advance among the information sources so that the date/time information D is obtained according to the priority. In this case, it is preferable for the information sources to be identifiable. If the date/time information D is obtained in relation to the information sources without being prioritized, the date/time information D according to the information sources can be used based on an instruction from the system or the user 2.

The information acquisition unit 43 estimates the scene represented by each of the image data sets S0 and obtains the scene information SC representing the scene. More specifically, a skin-color area is extracted from the image represented by each of the image data sets S0. If the skin-color area is judged to be included in the image in a predetermined proportion or higher, the image is judged to represent people. In the case where the skin-color area is included less than the predetermined proportion, the scene is judged to represent scenery. Furthermore, color temperature of the image can be calculated so that the scene is judged to represent a night view if the color temperature is equal to or lower than a predetermined value.

The character recognition of the imprinted date and the scene judgment are carried out according to software. However, accuracy of the recognition and judgment improves in response to upgrading the software. Therefore, version information on the software may be added to the date/time information D and the scene information SC. Upon upgrade of the software, the date/time information D and the scene information SC is obtained newly by sending the corresponding image data sets S1 from the image storage server 6 to the image generation apparatus 40 according to an instruction of the user 2. In this manner, the date/time information D and the scene information SC can be obtained with higher accuracy.

The information acquisition unit 43 obtains various kinds of information in addition to the date/time information D and the scene information SC. All the information comprises the information J.

FIG. 3 shows the information J in detail. As shown in FIG. 3, the information J comprises items such as date/time of digitization, the user ID, an order number, a frame number, the file name, the user file name, the folder name, type of film, the time period of film production, the time period of printing, the date of film production, the date of printing, the scene information, faded-color correction, orientation information, scar removal, redeye correction, APS-CHP, 135-FHP, a print size, the number of pixels, modification history, disclosure information, a disclosure level, deletion protection, editing protection, owner information 1 and 2, digitization information, a location of photography, a comment, and a memorandum.

The date/time of digitization refers to the date/time of image reading from the negative films NF or the prints P. The date/time added to each of the image data sets S0 as header information thereof is used as the date/time of digitization.

The user ID is obtained by the bar code reader 48.

The order number is the number issued in order of order reception in the laboratory 4 at the time of image reading, and the order number is input from the input unit 50.

The file name refers to the file name comprising a serial number given to each of the image data sets S0 in order of image reading.

The name of folder refers to the name of a folder generated according to the user name and the date/time information D or generated by the user, as will be explained later.

The film type refers to information obtained at the time of image reading from the negative films NF. More specifically, the item of film type includes information such as sensitivity, distinction between negative and positive films (in the case of image reading from a positive film), and the number of frames.

The items related to time, that is, the time period of film production, the time period of printing, the date of film production, and the date of printing correspond to the date/time information D, and are obtained by reading the DX code or the imprinted date with the information acquisition unit 43, or by an input of the date instructed by the user 2.

The item of scene information corresponds to the scene information SC described above.

The item of faded-color correction refers to a flag that is turned on in the case where faded-color correction processing is carried out as will be explained later.

The item of orientation information refers to information representing orientation of each of the images represented by the image data sets S0. A method has been proposed for judging the orientation according to brightness distribution information obtained by dividing each of the images represented by the image data sets into a plurality of areas and by calculating the brightness of each of the areas. The orientation can be judged based on the image data sets S0, as has been described above. However,the operator at the laboratory 4 may judge the orientation at the time of checking that will be explained later.

The item of scar removal refers to a flag that is turned on in the case where the scar removal processing is carried out for removing an image scar as will be explained later.

The item of red eye correction refers to a flag that is turned on in the case where the red eye correction processing is carried out as will be explained later.

The item "APS-CHP" represents information read from a magnetic recording area of an APS film used as one of the negative films NF.

The item "135-FHP" refers to the type of each of the images represented by the image data sets S0. More specifically, the information represents a photograph area in which a photograph is actually recorded in each of the films, such as areas for full size, panoramic size, high-definition size, and half size.

The item of print size refers to the size of each of the prints P in the case where the image data sets S have been obtained by reading the prints P.

The item of the number of pixels refers to the number of pixels in each of the images represented by the image data sets S0.

The item of modification history represents history of modifications in each of the image data sets S0 and in image attribute information that will be explained later.

The item of disclosure information refers to information representing whether or not an access to the image data sets by others is allowed when the image data sets are stored in the image storage server 6.

The item of disclosure level refers to how a third person can use the image data sets in the case where the person accesses the image data sets. More specifically, viewing, printing, distribution, downloading, attachment to an E-mail message, editing, and adding a comment may be allowed, for example.

The item of deletion protection refers to a flag that prevents deletion of each of the image data sets.

The item of editing protection refers to a flag that prevents editing of each of the image data sets.

The item of owner information 1 refers to information that the user 2 can use. For example, in the case where the owner of the negative films NF or the prints P from which the images were read is different from the user 2, the owner information represents the owner.

The item of owner information 2 is also used by the user 2 and refers to information representing how to contact the owner of the negative films NF or the prints P. The phone number or the E-mail address of the owner can be used as the owner information 2, for example.

The item of digitization information refers to information on an apparatus that read the images. More specifically, the name of the model and the model number for identifying the film scanner 41 or the print scanner 42 is used as the digitization information, for example.

The item of location of photography refers to information on a location where photography was carried out. For example, GPS information recorded in the magnetic recording area of an APS film may be used as the location information.

The item of comment is used by the user 2, and the user 2 can record any information as he/she wishes.

The item of memorandum is used by the laboratory 4, and the operator therein can record any information as he/she wishes.

The information J shown in FIG. 3 is not all obtained in the laboratory 4. Some of the items of the information J are used by the user 2 after registration with the data base that will be explained later. Therefore, columns for data entry in FIG. 3 are divided into columns for the laboratory 4 and a column for the user 2. The columns for the laboratory 4 are further divided into a column representing automatic input and a column representing manual input by the operator in the laboratory 4. By inputting circles in corresponding cells, how and where each of the items of the information J is input can be clearly shown. The parenthesis ( ) refers to the case where manual input is possible.

The image processing unit 44 carries out the image processing such as gradation conversion processing, color conversion processing, and sharpness processing on the image data sets S0 and obtains the processed image data sets S1. In some cases, the negative films NF or the prints P of the user 2 are scarred or have faded colors such as a sepia color due to elapsed time. In other cases, red eyes are observed in the case of flash photography.

For this reason, the image processing unit 44 may carry out the image restoration processing such as faded-color correction processing for correcting the faded colors into normal colors, scar removal processing, and red eye correction processing on the image data sets S0. The image restoration processing may be carried out automatically by analyzing the image data sets S0. Alternatively, in order to meet a demand by the user 2 who wishes to store the images as they are, the image restoration processing may be carried out only in the case where the user 2 orders the processing. Furthermore, the image restoration processing may be carried out on all the image data sets S0 according to an instruction by the user 2. The user 2 orders the image restoration processing at the time he/she visits the DPE store 3, and the instruction is written on the order form. Therefore, the operator in the laboratory 4 can confirm whether or not the image restoration processing is carried out according to the instruction by the user 2, by referring to the order form.

At the time of image reading by the film scanner 41, infrared rays may be irradiated on the negative films so that IR data sets corresponding to the image data sets S0 can be obtained by reading the infrared rays that have passed the films. Based on the IR data sets, the scar removal processing may be carried out. In other words, the IR data sets obtained by irradiation of the infrared rays on the films represent a position and a degree of deficiency in some of the image data sets S0 caused by a scar or dust. By obtaining such IR data sets and by carrying out the scar removal processing according to the IR data sets, the scar can be removed efficiently.

Figure 4:
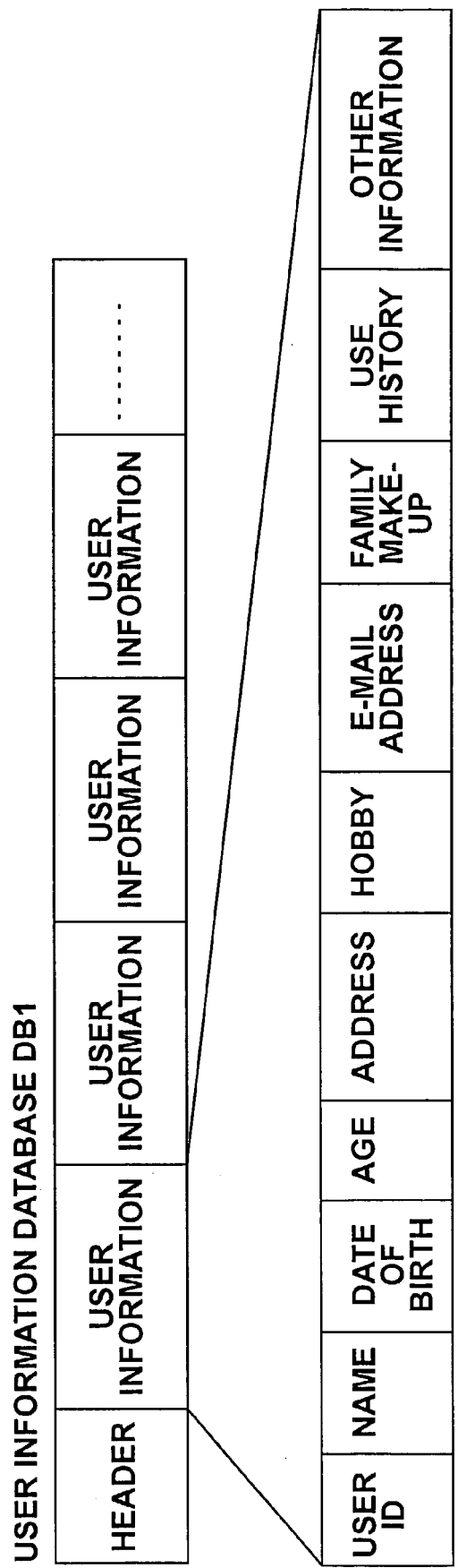
FIG. 4 shows a configuration of a user information database.

The hard disc 46 stores the user information database DB1 representing the user information and the date/time database DB2 representing the relationship between the DX code and the time period of film production. The user information database DBJ comprises the user information and header information that manages the user information, as shown in FIG. 4. When a new user registers his/her membership, the user information database DB1 is updated. The user information comprises the user ID, the name, date of birth, age, the address, a hobby, the E-mail address, and family make-up of the user, in addition to use history of the image data sets and other information.

Figure 5:
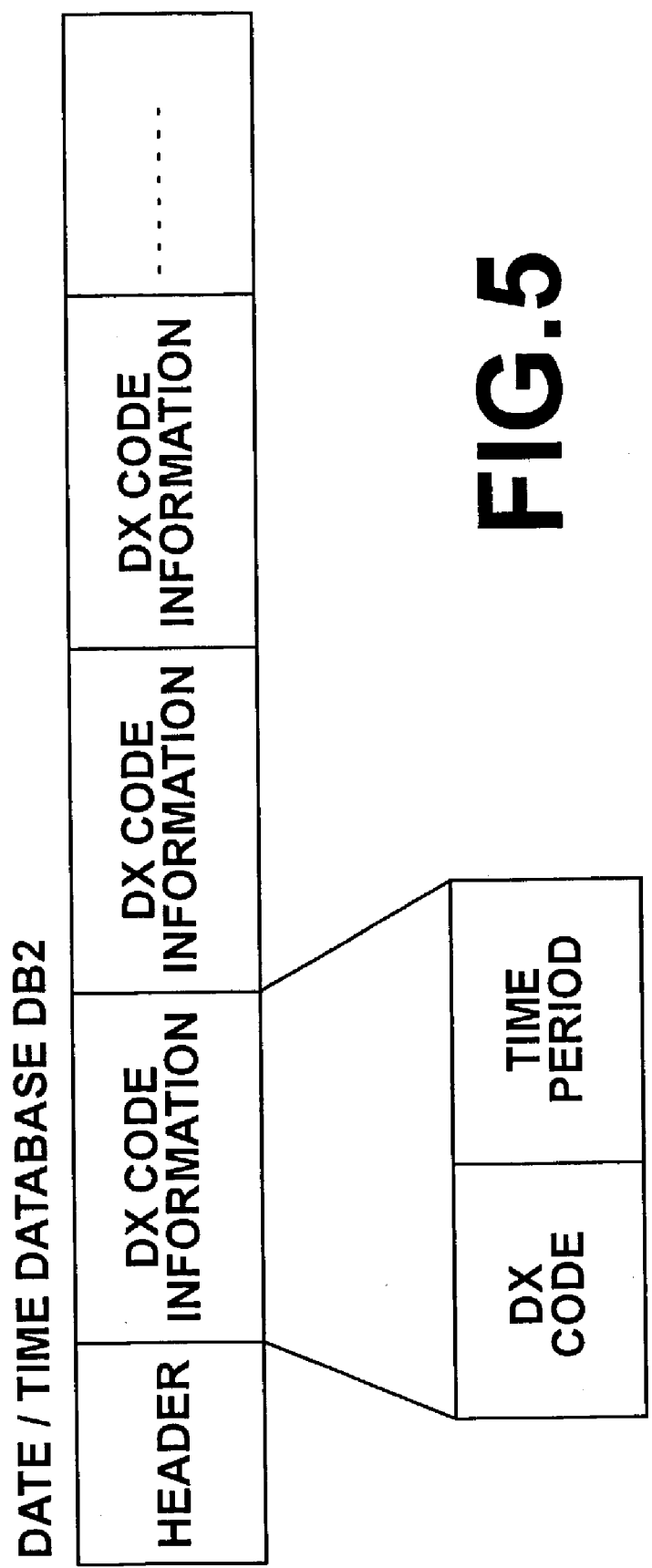
FIG. 5 shows a configuration of a date/time database.

The date/time database DB2 comprises DX code information and header information that manages the DX code information, as shown in FIG. 5. More specifically, the DX code information comprises the DX code and information on the time period of production of the films from which the DX code is obtained.

The information acquisition unit 43 reads the DX code recorded on each of the negative films NF, and obtains the information on the time period of production of the negative films NF as the date/time information D, by referring to the date/time database DB2.

The external recording device 47 is used for recording the processed image data sets S1 in a recording medium such as a CD-R, a DVD-R, an MO disc, or an optical card. The external recording device 47 comprises a CD-R drive, a DVD-R drive, an MO disc drive, and an optical card writing device.

The control unit 49 carries out various kinds of control on the image generation apparatus 40 according to an instruction input from the input unit 50 by the operator in the laboratory 4. More specifically, the control unit 49 reads the images from the negative films NF by using the film scanner 41, reads the images from the prints P by using the print scanner 42, acquires the information J by using the information acquisition unit 43, carries out the image processing by using the image processing unit 44, sends the processed image data sets S1 and the information J from the input/output port 45, stores the image data sets S1 in the hard disc 46, reads the store ID and the user ID by using the bar code reader 48, and records the image data sets S1 in the recording medium by using the external recording device 47.

Figure 6:
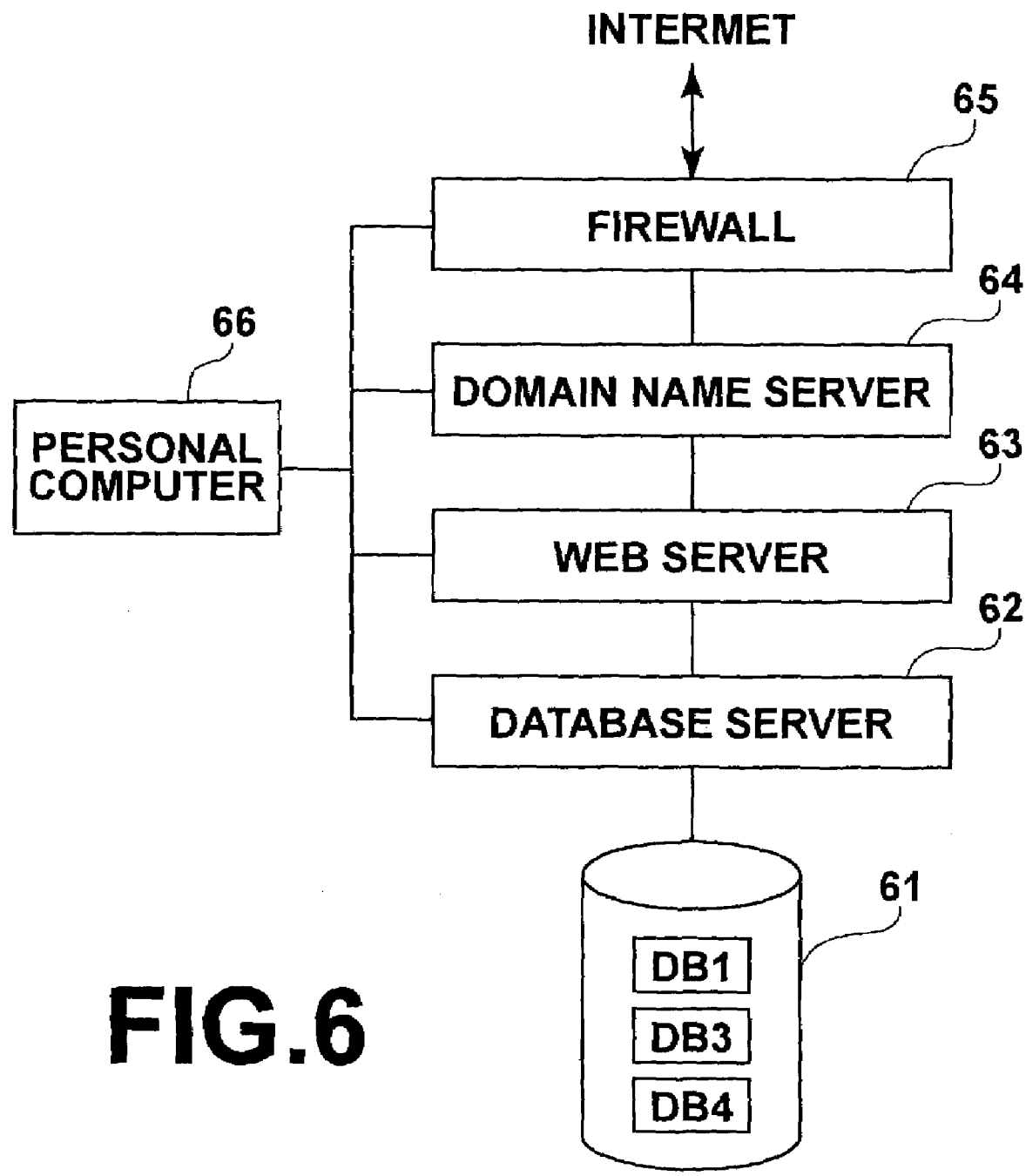
FIG. 6 is a block diagram showing a configuration of an image storage server.

The image storage server 6 comprises a storage unit 61, a database server 62 for controlling the various kinds of databases stored in the storage unit 61, a Web server 63 for generating a Web page to be displayed on the user terminal 20 at the time of an access from the user terminal 20, a domain name server 64 for managing the domain name of the image storage server 6, a firewall 65 connected to the Internet 7 for protecting the image storage server 6 from an unauthorized access, and a personal computer 66 for managing the database server 62, the Web server 63, the domain name server 64 and the firewall 65, as shown in FIG. 6.

According to classification by the user, the image storage server 6 stores the processed image data sets S1 that are sent from the image generation apparatus 40, classified by the film roll. The image storage server 6 also stores the processed image data sets S1 according to the time period included in the date/time information D comprising the information J. The image storage server 6 lays out the processed image data sets S1 in a Web page according to an instruction from the user terminal 20 of the user 2, and sends the Web page thereto. Furthermore, the image storage server 6 sends the processed image data sets S1 to the laboratory 4 in order to process a printing order placed by the user 2 via the user terminal 20.

The personal computer 66 issues a new user ID and a new password when new user information is received, and relates the processed image data sets S1 stored in the storage unit 61 to the various kinds of information. The personal computer 66 also classifies and organizes the processed image data sets S1.

The storage unit 61 comprises a large-capacity hard disc to store the various databases and the processed image data sets S1 sent from the image generation apparatus 40 in a large volume.

Figure 7:
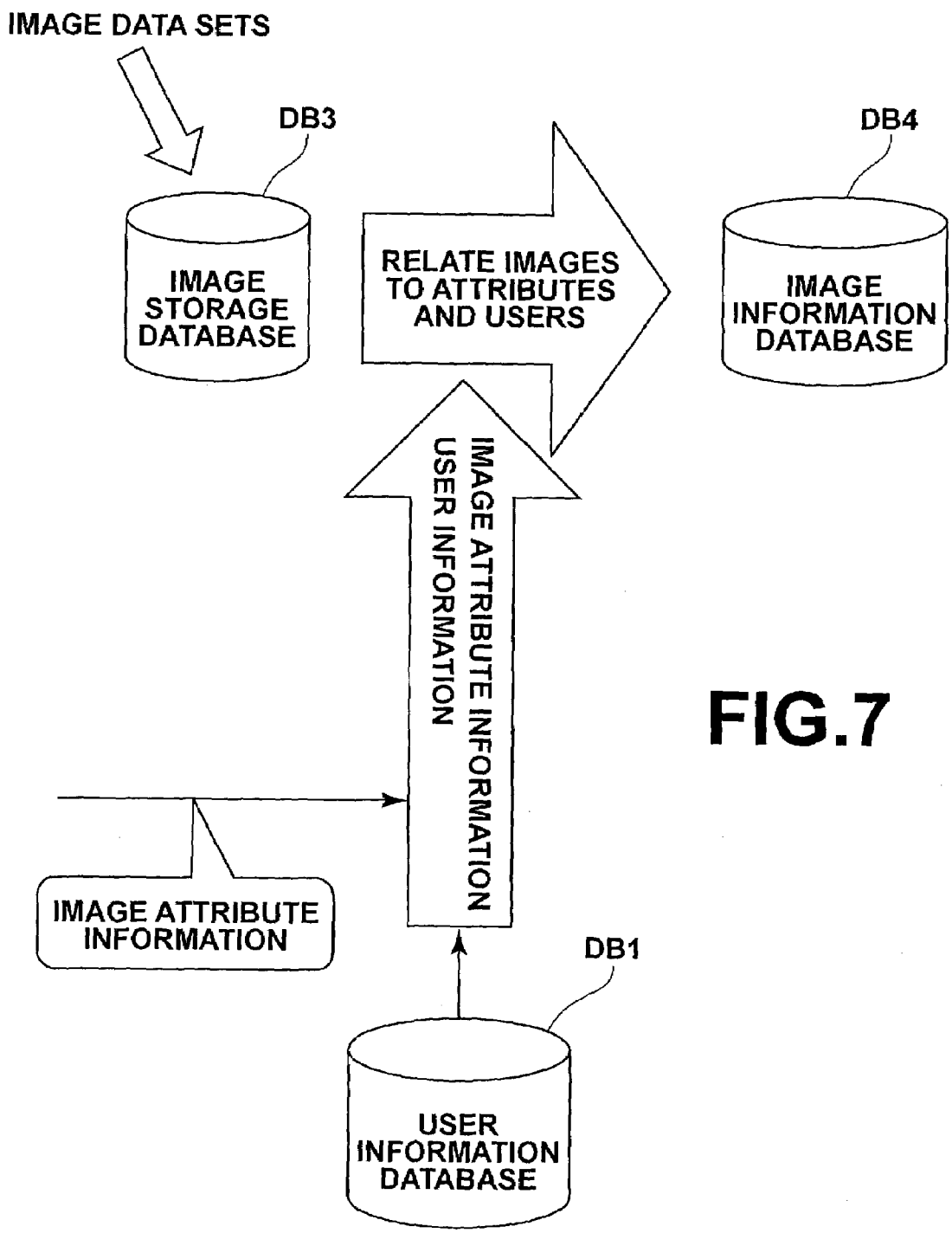
FIG. 7 shows relationships between an image storage database, the user information database, and an image information database.

The storage unit 61, as shown in FIG. 7, comprises an image storage database DB3 for storing the processed image data sets S1 sent from the image generation apparatus 40, a user information database DB1 that is the same as the user information database DB1 stored in the image generation apparatus 40, and an image information database DB4 relating to each other the user information database DB1, the image storage database DB3, and the like. The data base server 62 manages the image storage database DB3, the user information database DB1, and the image information database DB4.

The image storage database DB3 comprises the processed image data sets S1 sent from the image generation apparatus 40 and basic image information that represents basic information such as the size of the respective processed image data sets S1. Therefore, when the image storage server 6 newly receives processed image data sets S1, the image storage database DB3 is updated. In the image storage database DB3, folders for storing the processed image data sets S1 are available for each of the users 2 (see FIG. 8). The processed image data sets S1 are also classified according to the users 2 as well as the time period with reference to the date/time information D, in the image storage database DB3.

For this reason, folders classified by the time period also exist under each of the folders for the users 2.

The film roll comprises the plurality of negative films NF. Therefore, folders classified by the negative films NF may be used under each of the time period folders so that the processed image data sets S1 are further classified according to the negative films NF.

The basic image information comprises a serial number, the user ID, the image ID, the size, and the date/time of update, as shown in FIG. 9. The user ID is used for identifying the user 2 who requested storage of the processed image data sets S1. The image ID is the file name of each of the processed image data sets S1 and used for image identification. The size refers to the data size of each of the image data sets S1. The date/time of update refers to the date/time of latest update of each of the image data sets S1 due to the image processing or the like.

The image information database DB4 stores not only the information relating the image storage database DB3 to the user information database DB1 but also image storage information related to the image attribute information.

The image attribute information refers to information representing attributes of the processed image data sets S1, that is, detailed information on the processed image data sets S1. More specifically, the image attribute information is the same as the information J shown in FIG. 3.

The image information database DB4 comprises the user ID, the image ID, the size, the date/time of update, the image attribute information, the user information, and other information, as shown in FIG. 10.

The Web server 63 is used for generating the Web page to be displayed on the user terminal 20 at the time of an access by the user terminal 20, and for managing a Web site of the image storage server 6. The Web server 63 issues a new user ID and a new password when new user information is received. The Web server 63 also reads the processed image data sets S1 and the information J if necessary by accessing the storage unit 61 according to an instruction from the user terminal 20, relates the processed image data sets S1 to the various kinds of information, and generates a Web page for classifying the processed image data sets S1.

Hereinafter, procedures carried out in the image storing system 1 having the above configuration will be explained. In the example below, the user 2 requests from the DPE store 3 image reading from the negative films NF and storing of the image data sets.

The user 2 registers his/her membership at the DPE store 3 and receives the user ID card 22. The user ID card 22 is issued when the user 2 requests film development and printing or at the time the user 2 purchases a film or a camera at the DPE store 3. The user ID card 22 may be issued when the user 2 registers his/her membership by accessing the Web site of the image storage server 6 from the user terminal 20. The user ID card 22 has the name, the phone number, and the address of the user 2 written thereon, and the user ID specific to the user 2 is printed thereon as the bar code. The user ID is related to the user information database DB1. By sending the user ID to the image generation apparatus 40 and to the image storage server 6, the various kinds of information on the user 2 can be obtained with reference to the user information database DB1.

The user 2 brings the negative films NF stored in the film storage sheets to the DPE store 3, and requests image reading and storing the images in the image storage server 6. At this time, the user 2 provides the user ID card 22 to the DPE store 3, together with the negative films NF. A clerk at the DPE store 3 confirms the number of the film storage sheets storing the negative films NF brought by the user 2, and transcribes the number on the order form. The clerk reads the bar code printed on the user ID card 22, with use of the bar code reader 32. The clerk then prints the bar code label BC having the user ID and the store ID, by using the printer 34. The clerk also transcribes on the order form the name and the phone number of the user 2 written on the user ID card 22. The clerk then puts the negative films NF and the order form in the container 36 dedicated to the user, and attaches the bar code label BC thereto. The container 36 is sent to the laboratory 4. In the case where other users 2 also visit the DPE store 3 to place orders, the container 36 is prepared for each of the users 2 who requests image reading and delivered to the laboratory 4. A copy of the order form is provided to each of the users 2.

Figure 11:
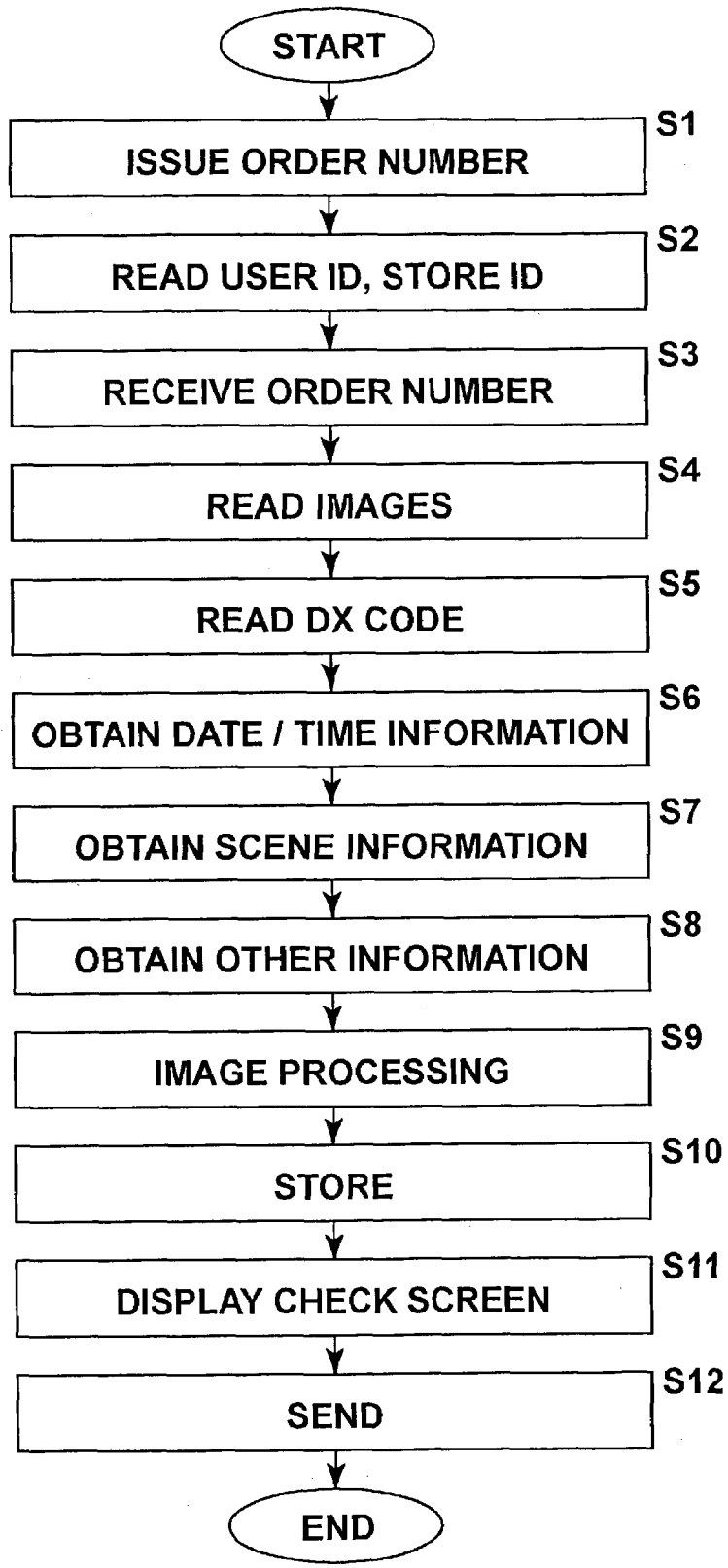
FIG. 11 is a flow chart showing procedures carried out in the image generation apparatus.

The operator at the laboratory 4 carries out image reading from the negative films NF in each of the containers, that is, for each of the users 2 by using the image generation apparatus 40. FIG. 11 is a flow chart showing procedures carried out in the laboratory 4. Each of the containers 36 is received and the control unit 49 issues the order number in order of order reception (Step S1). The order number is displayed on the monitor 51 and transcribed on the order form by the operator. The operator in the laboratory 4 then takes out the negative films NF from the film storage sheets and puts all the film pieces together to form the film roll.

The film roll generated in the above manner is set on the film scanner 41, and the bar code reader 48 reads the user ID as well as the store ID from the bar code label BC attached to the container (Step S2). An input of the order number by the operator is then received (Step S3), and the images are read from the film roll by the film scanner 41 (Step S4) to generate the image data sets S0.

The information acquisition unit 43 reads the DX code from each of the negative films NF comprising the film roll (Step S5). As has been described above, the notches are used to represent the joints between the negative films NF in the film roll. Therefore, by obtaining the boundary information through detection of the notches, the boundaries of the negative films NF are related to the image data sets S0 obtained from the negative films NF. After reading of the DX code, the date/time database DB2 stored in the hard disc 46 is referred to, and the time period corresponding to the DX code is obtained as the date/time information D (Step S6).

The information acquisition unit 43 may alternatively read the date imprinted on each of the frames in the negative films NF, and carry out character recognition to obtain the date/time information D. In the case of an APS film having the magnetic recording area described above, the information on the date of photography recorded in the magnetic recording area may be read and used as the date/time information D. In this case, the date/time information D represents the date of photography.

The information acquisition unit 43 analyzes the scene represented by each of the image data sets S0, and obtains the scene information SC (Step S7).

All the other kinds of information comprising the information J are also obtained thereafter (Step S8).

Figure 8:
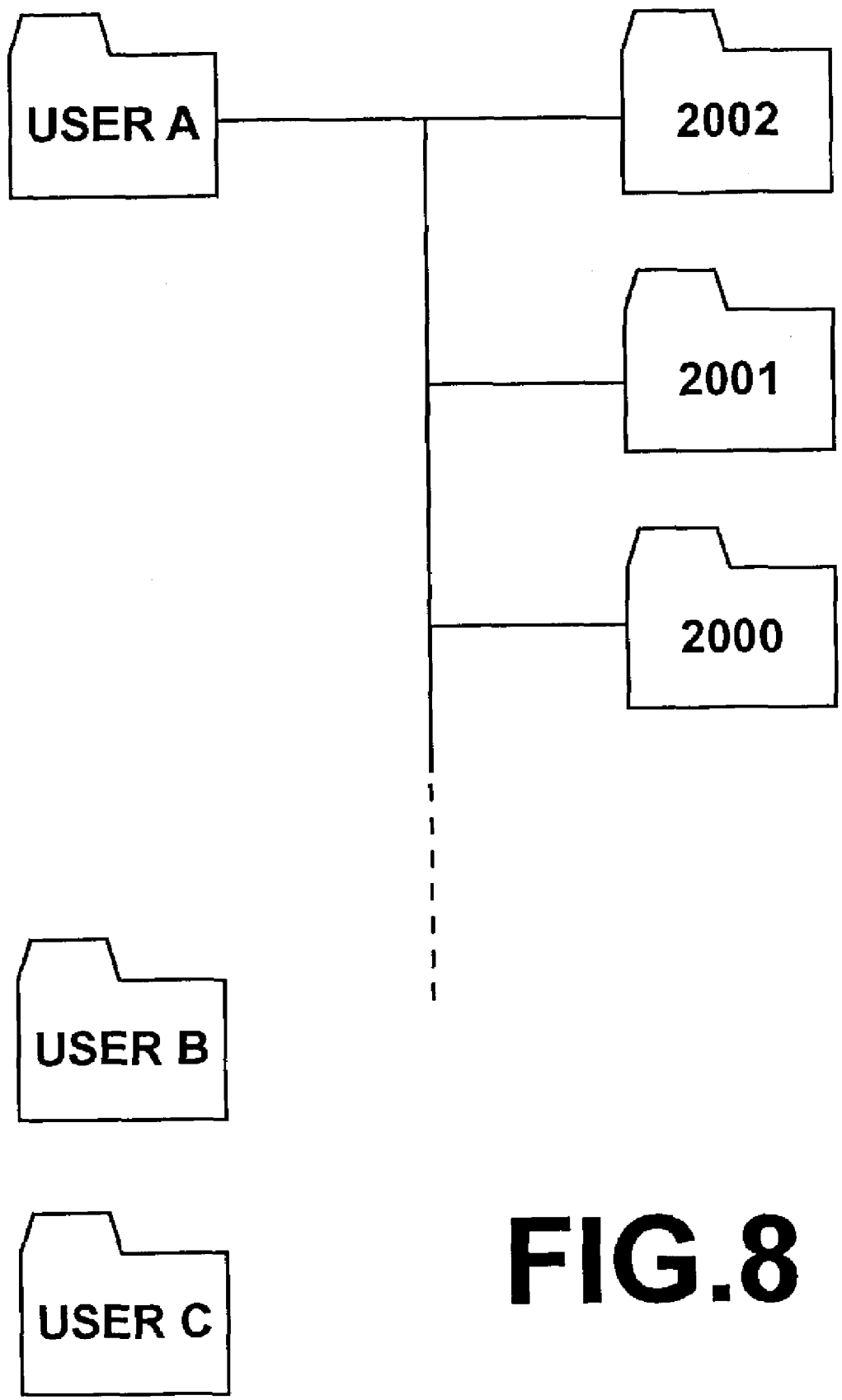
FIG. 8 shows a structure of a folder in the image storage database.

The image data sets S0 are subjected to the image processing by the image processing unit 44, and the processed image data sets S1 are obtained (Step S9). At this time, the image restoration processing is also carried out if necessary. The processed image data sets S1 are stored in the hard disc 46, together with the information J (Step S10). At this time, as shown in FIG. 8, the folders are generated for each of the users 2, and the time period folders are then generated in each of the user folders. The processed image data sets S1 are classified according to the users 2 and according to the time period with reference to the date/time information D, and stored in the hard disc 46.

The image processing unit 44 carries out the gradation conversion processing, density correction processing, the sharpness processing, and the like. Furthermore, if necessary, the image restoration processing such as the faded-color correction processing, the scar removal processing, and the red eye correction processing is carried out. Since the negative films NF are stored in the film storage sheets in the form of film pieces, some of the image data sets S0 obtained from the film pieces may represent reversed images due to the film pieces reversed at the time of film roll generation. For this reason, the date imprinted in each of the images represented by the image data sets S0 may be read and subjected to character recognition. In the case where the character recognition is not carried out successfully for some of the images, the images are judged to have been reversed and the corresponding image data sets S0 are subjected to reversal processing. At the time of generation of the film roll, the notches are used for the joints between the film pieces, as has been described above. Therefore, by referring to the boundary information obtained from the notches, whether or not the image data sets S0 are reversed can be confirmed, for each of the film pieces.

Furthermore, at the time of film roll generation, some of the film pieces may be put together upside down. As a result, when image reading is carried out on the film roll, the image data sets corresponding to the film pieces that were put upside down are read in reverse order of photography. In this case, the positions of the date imprinted in each of the images or the DX code recorded on the negative films become different from proper positions. Therefore, by detecting the position of the date or the DX code, whether each of the film pieces is placed upside down can be judged. In the case of film piece or pieces being upside down, the corresponding image data sets S0 are subjected to 180° rotation processing and processing for changing the order of the image data sets S0 into the order of photography is also carried out.

Figure 12:
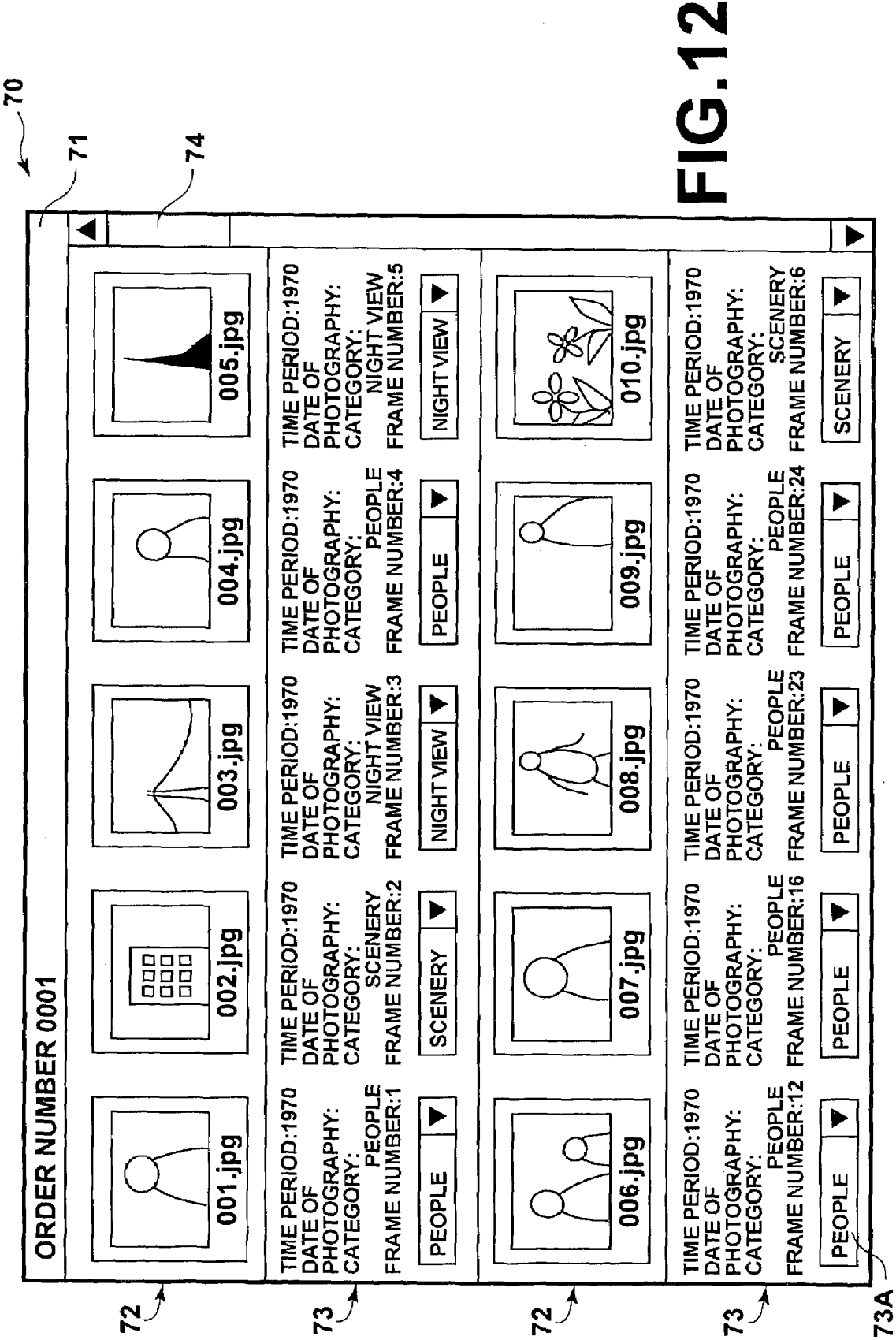
FIG. 12 shows a check screen.

The processed image data sets S1 and the information J are read from the hard disc 46, and a check screen is displayed on the monitor 51 (Step S11). FIG. 12 shows an example of the check screen. As shown in FIG. 12, a check screen 70 comprises an order number display field 71 for displaying the order number, thumbnail image display fields 72 for displaying thumbnail images of the images represented by the processed image data sets S1 obtained in the request of image storing (that is, the processed image data sets S1 of the user 2), information display fields 73 for displaying the information on the images, and a scroll bar 74 for scrolling the screen.

The thumbnail images and the filenames of the images represented by the processed image data sets S1 are displayed in the thumbnail image display fields 72. The file names are given in order of image reading from the film roll, and the file names in this example are "001.jpg", "002.jpg" and so on.

Each of the information display fields 73 has fields for displaying the time period, the date of photography, a category, and the frame number for each of the images and a selection menu 73A for selecting the category. The time period is determined based on the date/time information D corresponding to each of the images. The date of photography is displayed in the case where the date/time information D can specify the date, and not displayed in the case where the date/time information D specifies the time period only. The category is displayed based on the scene information SC, and items such as people, scenery, and night view are displayed in this example. The frame number shows the order of image reading from the film roll, and corresponds to the file name of each of the images.

Although the category can be classified based on the scene information SC, the category given to the images may be wrong in some cases. In this case, the operator in the laboratory 4 preferably selects the category from the selection menu 73A as desired, by referring to the images. The selection menu 73A comprises a pull-down menu, which makes selection of the category easier.

The operator in the laboratory 4 checks the images in the check screen 70. Although the image restoration processing has been carried out by the image processing unit 44 in this example, only the image processing may be carried out by the image processing unit 44. In this case, the image restoration processing is carried out according to an instruction input from the input unit 50 by the operator who checks the images in the check screen.

The images are not necessarily checked and processed for reversed images by the image processing unit 44. The operator in the laboratory 4 may check and process the reversed images manually while viewing the check screen.

After the check, the operator inputs completion of the check by using the input unit 50, and the processed image data sets S1 and the information J are sent from the input/output port 45 to the image storage server 6 (Step S12). The procedures carried out by the image generation apparatus 40 are then completed. The processed image data sets S1 are sent in a film-roll unit, that is, in user units (in other words, for each of the users 2 who requested image storage).

After transfer of the processed image data sets S1, the operator in the laboratory 4 processes the invoice according to the number of images that have been read, and returns each of the containers 36 to the DPE store 3.

Figure 13:
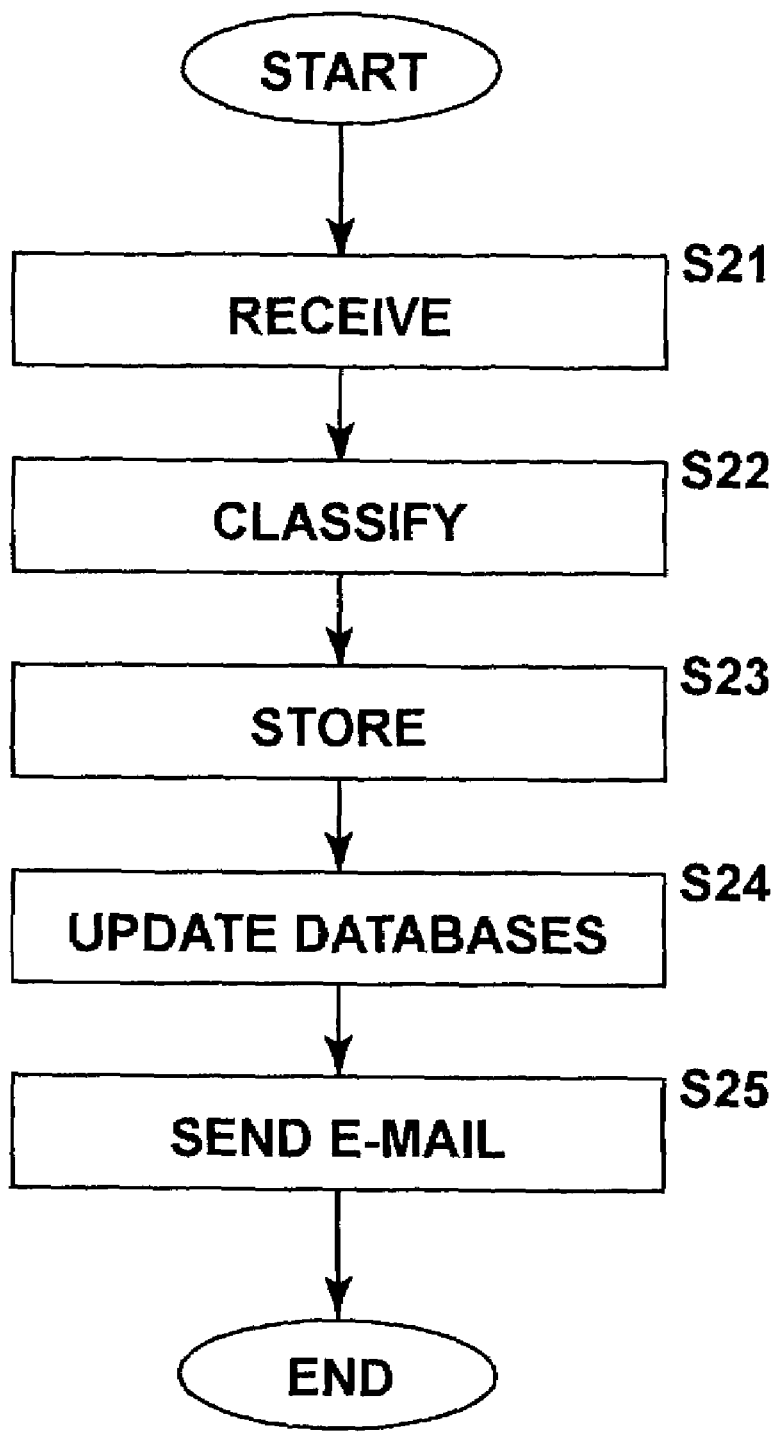
FIG. 13 is a flow chart showing procedures carried out in the image storage server.

Procedures carried out by the image storage server 6 will be explained next. FIG. 13 is a flow chart showing the procedures. The processed image data sets S1 and the information J are received (Step S21), and the processed image data sets S1 are classified according to the user ID and the date/time information D (Step S22). The processed image data sets S1 are then stored in the image storage server 6 (Step S23). More specifically, the user information database DB1 is referred to according to the user ID, and the processed image data sets S1 are stored in the folder for the user 2 corresponding to the user ID. In the case where the folder corresponding to the user ID does not exist, a new user folder is generated. As shown in FIG. 8, time period folders such as 2002 and 2001 are also generated under the user folder, and the processed image data sets S1 are further classified according to the date/time information D to be stored in the corresponding time period folders.

The processed image data sets S1 may be classified by actually moving the processed image data sets S1 into the corresponding time period folders. However, all the processed image data sets S1 may be stored in one of the folders. In this case, each of the time period folders stores only a shortcut to each of the processed image data sets S1. In this manner, the processed image data sets S1 seem to be stored in the respective time period folders.

The processed image data sets S1 are related to the image storage database DB3, to the image attribute information, and to the user information database DB1 according to the information J, and the image information database DB4 is updated (Step S24). In this manner, the processed image data sets S1 are stored. An E-mail message notifying that the processed image data sets S1 have been completely stored is then sent to the E-mail address of the user 2 that is obtained from the user information database DB1 (Step S25) to end the procedures.

The user 2 receives the E-mail message and accesses the Web site of the image storage server 6 from the user terminal 20. The user is authenticated by an input of the user ID and the password, and the Web server 63 generates the Web page for the user to view the images, after the user is authenticated. The Web page is displayed on the user terminal 20.

The user 2 can view the images, further organize the images for later use, and place a printing order. For example, the user 2 can change the image file names, sort the processed image data sets in an order desired by the user 2, classify the processed image data sets S1 in folders for himself/herself, for his/her friends, and for his/her family, delete any images that are not necessary, and classify the processed image data sets according to category or theme. The images that have been organized in the above manner are moved to an organized data folder that is generated under the user folder. At this time, the user 2 may actually move the processed image data sets S1. Alternatively, a shortcut to the processed image data sets S1 to be moved may be generated and moved in the organized data folder.

As has been described above, according to this embodiment, the processed image data sets S1 generated by reading the images from the negative films NF that have been neglected are classified and stored based on the user information and the date/time information D obtained from the negative films NF. Therefore, by only requesting image reading without organizing the large amount of the negative films NF or the prints P, the user 2 can view the processed image data sets S1 in the organized state. Furthermore, since the processed image data sets S1 are stored in classification by the user, the processed image data sets S1 can be related easily to the user 2. Moreover, the user 2 can easily organize the processed image data sets S1 as he/she wishes.

By obtaining the scene information SC and relating the scene information SC to the processed image data sets S1, the processed image data sets S1 can also be classified according to the scene information.

In the above embodiment, the processed image data sets S1 generated by reading the negative films NF or the prints P are stored in the folders in the image storage server 6. However, the external recording device 47 of the image generation apparatus 40 may classify the processed image data sets S1 into the folders and record the processed image data sets S1 in a recording medium to be provided to the user 2.

In the above embodiment, the processed image data sets S1 each having the same number of pixels are stored in the image storage server 6. However, a plurality of image data sets of different resolutions may be generated for each of the images and stored in the image storage server 6. By generating the image data sets of different resolutions, the image data sets can be used easily according to their use such as for monitor display, printing, and wallpaper for a screen of a cellular phone. In this manner, the processed image data sets can be used more easily.

In this case, the image processing and the image restoration processing carried out in the laboratory 4 may be applied only to the image data sets having are solution appropriate for monitor display. For the image data sets having a high resolution for printing, no image processing is carried out and stored in the image storage server 6 as they are. In this manner, the time necessary for the image processing can be shortened, and image reading can be carried out efficiently.

In the above embodiment, in the case of image reading from the negative films NF, the film roll is generated from the film pieces stored in the film storage sheets and taken out therefrom. However, image reading may be carried out on the film pieces while they are stored in the film storage sheets. In this case, the image data sets S0 are obtained by finding the difference between the image data sets obtained by reading the negative films stored in the film storage sheets and image data sets representing only the film storage sheets generated by reading the film storage sheet alone.

A skilled artisan would know that computer readable media are not limited to any specific type of storage device and include any kind of device, including but not limited to CDs, floppy discs, RAMs, ROMs, hard discs, magnetic tapes, and internet downloads, in which computer instructions can be stored and/or transmitted. Transmission of the computer code through a network or through wireless transmission means is also within the scope of this invention. Additionally, computer code/instructions include, but are not limited to, source, object, and executable code and can be in any language including higher level languages, assembly language and machine language.

What is claimed is:

1. An image storing method comprising the steps of:
    obtaining at least one image data set representing at least one image by photoelectrically reading the image or images from a recording medium that records the image or images thereon;
    obtaining recording medium information regarding the recording medium and user information representing a user who requested the reading of the image or images; and
    storing the image data set or sets in classification according to the user, based on the user information, while relating the image data set or sets to the recording medium information.

2. An image storing method as defined in claim 1, wherein the recording medium information includes information on date/time of photography recorded in the recording medium and/or specified by the user, regarding the image or images.

3. The image storing method as defined in claim 2, wherein the date/time of photography is estimated based on a DX code recorded on the recording medium.

4. An image storing method as defined in claim 1, further comprising the step of:
    obtaining at least one item of characteristic information representing at least one characteristic of the image or images, wherein
    the step of storing the image data set or sets is the step of storing the image data set or sets in further relation to the item or items of characteristic information.

5. An image storing method as defined in claim 2, further comprising the step of:
    obtaining at least one item of characteristic information representing at least one characteristic of the image or images, wherein
    the step of storing the image data set or sets is the step of storing the image data set or sets in further relation to the item or items of characteristic information.

6. An image storing method as defined in claim 1, further comprising the step of:
    carrying out image processing including image restoration processing on the image data set or sets.

7. An image storing method as defined in claim 2, further comprising the step of:
   carrying out image processing including image restoration processing on the image data set or sets.

8. An image storing method as defined in claim 4, further comprising the step of:
   carrying out image processing including image restoration processing on the image data set or sets.

9. An image storing method as defined in claim 5, further comprising the step of:
   carrying out image processing including image restoration processing on the image data set or sets.

10. The image storing method as defined in claim 1, further comprising the steps of:
    reading the images out film-roll by film-roll; and
    storing in a separate folder the image data read out from each film-roll.

11. The image storing method as defined in claim 1, further comprising the steps of:
    producing a film-roll by putting a plurality of film pieces together;
    adding boundary information representing boundaries between the film pieces;
    reading the images out film-roll by film-roll; and
    storing in a separate folder the image data read out from each film-roll for the film pieces.

12. An image storing system comprising:
    image reading means for obtaining at least one image data set representing at least one image by photoelectrically reading the image or images from a recording medium that records the image or images thereon;
    information acquisition means for obtaining recording medium information regarding the recording medium and user information representing a user who requested the reading of the image or images; and
    image storing means for storing the image data set or sets in classification according to the user, based on the user information, while relating the image data set or sets to the recording medium information.

13. An image storing system as defined in claim 12, wherein the recording medium information includes information on date/time of photography recorded on the recording medium and/or specified by the user, regarding the image or images.

14. The image storing system as defined in claim 13, wherein the date/time of photography is estimated based on a DX code recorded on the recording medium.

15. An image storing system as defined in claim 12, wherein the information acquisition means obtains at least one item of characteristic information on the image or images; and
    the image storing means stores the image data set or sets in further relation to the item or items of characteristic information.

16. An image storing system as defined in claim 13, wherein the information acquisition means obtains at least one item of characteristic information on the image or images; and
    the image storing means stores the image data set or sets in further relation to the item or items of characteristic information.

17. An image storing system as defined in claim 12, further comprising image processing means for carrying out image processing including image restoration processing on the image data set or sets.

18. An image storing system as defined in claim 13, further comprising image processing means for carrying out image processing including image restoration processing on the image data set or sets.

19. An image storing system as defined in claim 15, further comprising image processing means for carrying out image processing including image restoration processing on the image data set or sets.

20. An image storing system as defined in claim 16, further comprising image processing means for carrying out image processing including image restoration processing on the image data set or sets.

21. The image storing system as defined by claim 12, wherein the images are read out film-roll by film-roll, and the image data read out from each film-roll is stored in a separate folder.

22. The image storing system as defined in claim 12, further comprising:
    a film-roll produced by putting a plurality of film pieces together, to which boundary information representing boundaries between the film pieces have been added,
    wherein the images are read out film-roll by film-roll, and the image data read out from each film-roll is stored in a separate folder for the film pieces.

23. A computer-executable program stored in a computer readable medium that causes a computer to execute an image storing method comprising the steps of:
    obtaining at least one image data set representing at least one image by photoelectrically reading the image or images from a recording medium that records the image or images thereon;
    obtaining recording medium information regarding the recording medium and user information representing a user who requested the reading of the image or images; and
    storing the image data set or sets in classification according to the user, based on the user information, while relating the image data set or sets to the recording medium information.

24. A computer-executable program stored in a computer readable medium as defined in claim 23, wherein the recording medium information includes information on date/time of photography recorded in the recording medium and/or specified by the user, regarding the image or images.

25. The computer-executable program stored in a computer readable medium that causes a computer to execute an image storing method as defined by claim 24, wherein the date/time of photography is estimated based on a DX code recorded on the recording medium.

26. A computer-executable program stored in a computer readable medium as defined in claim 23, the program further comprising the step of:
    obtaining at least one item of characteristic information representing at least one characteristic of the image or images, wherein
    the step of storing the image data set or sets is the step of storing the image data set or sets in further relation to the item or items of characteristic information.

27. A computer-executable program stored in a computer readable medium as defined in claim 24, the program further comprising the step of:
    obtaining at least one item of characteristic information representing at least one characteristic of the image or images, wherein
    the step of storing the image data set or sets is the step of storing the image data set or sets in further relation to the item or items of characteristic information.

28. A computer-executable program stored in a computer readable medium as defined in claim 23, further comprising the step of:
   carrying out image processing including image restoration processing on the image data set or sets.

29. A computer-executable program stored in a computer readable medium as defined in claim 24, further comprising the step of:
   carrying out image processing including image restoration processing on the image data set or sets.

30. A computer-executable program stored in a computer readable medium as defined in claim 26, further comprising the step of:
   carrying out image processing including image restoration processing on the image data set or sets.

31. A computer-executable program stored in a computer readable medium as defined in claim 27, further comprising the step of:
   carrying out image processing including image restoration processing on the image data set or sets.

32. The computer-executable program stored in a computer readable medium that causes a computer to execute an image storing method as defined in claim 23, further comprising the steps of:
   reading the images out film-roll by film-roll; and
   storing in a separate folder the image data read out from each film-roll.

33. The computer-executable program stored in a computer readable medium that causes a computer to execute an image storing method as defined by claim 23, further comprising the steps of:
   producing a film-roll by putting a plurality of film pieces together;
   adding boundary information representing boundaries between the film pieces;
   reading the images out film-roll by film-roll; and
   storing in a separate folder the image data read out from each film-roll for the film pieces.

34. A computer-readable recording medium storing a program that causes a computer to execute an image storing method comprising the steps of:
   obtaining at least one image data set representing at least one image by photoelectrically reading the image or images from a recording medium that records the image or images thereon;
   obtaining recording medium information regarding the recording medium and user information representing a user who requested the reading of the image or images; and
   storing the image data set or sets in classification according to the user, based on the user information, while relating the image data set or sets to the recording medium information.

35. A computer-readable recording medium as defined in claim 34, wherein the recording medium information includes information on date/time of photography recorded in the recording medium and/or specified by the user, regarding the image or images.

36. A computer-readable recording medium as defined in claim 34, the program further comprising the step of:
   obtaining at least one item of characteristic information representing at least one characteristic of the image or images, wherein
   the step of storing the image data set or sets is the step of storing the image data set or sets in further relation to the item or items of characteristic information.

37. A computer-readable recording medium as defined in claim 35, the program further comprising the step of:
   obtaining at least one item of characteristic information representing at least one characteristic of the image or images, wherein
   the step of storing the image data set or sets is the step of storing the image data set or sets in further relation to the item or items of characteristic information.

38. A computer-readable recording medium as defined in claim 34, the program further comprising the step of:
   carrying out image processing including image restoration processing on the image data set or sets.

39. A computer-readable recording medium as defined in claim 35, the program further comprising the step of:
   carrying out image processing including image restoration processing on the image data set or sets.

40. A computer-readable recording medium as defined in claim 36, the program further comprising the step of:
   carrying out image processing including image restoration processing on the image data set or sets.

41. A computer-readable recording medium as defined in claim 37, the program further comprising the step of:
   carrying out image processing including image restoration processing on the image data set or sets.

* * * * *